(12) United States Patent
Langguth et al.

(10) Patent No.: US 9,373,189 B2
(45) Date of Patent: Jun. 21, 2016

(54) CONSTRUCTING 3D SURFACES FOR MULTI-COLOR OBJECTS

(71) Applicant: Adobe Systems Incorporated, San Jose, CA (US)

(72) Inventors: Fabian Langguth, Darmstadt (DE); Kalyan K. Sunkavalli, San Jose, CA (US); Sunil Hadap, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/540,493

(22) Filed: Nov. 13, 2014

(65) Prior Publication Data

US 2016/0140753 A1     May 19, 2016

(51) Int. Cl.
G06T 15/50     (2011.01)
G06T 5/00      (2006.01)
G06T 15/80     (2011.01)

(52) U.S. Cl.
CPC ............. *G06T 15/506* (2013.01); *G06T 5/002* (2013.01); *G06T 15/80* (2013.01); *G06T 2207/20112* (2013.01)

(58) Field of Classification Search
None
See application file for complete search history.

(56) References Cited

U.S. PATENT DOCUMENTS

2008/0309662 A1* 12/2008 Hassner ............... G06K 9/20
                                                 345/419
2014/0028677 A1*  1/2014 Sheikh ................ G06T 15/506
                                                 345/426

OTHER PUBLICATIONS

Han, Yudeog, Joon-Young Lee, and in So Kweon. "High quality shape from a single rgb-d image under uncalibrated natural illumination." Computer Vision (ICCV), 2013 IEEE International Conference on. IEEE, 2013.*
Barron, et al.,' "Intrinsic Scene Properties from a Single RGB-D Image", In Proceedings of the 2013 IEEE Conference on Computer Vision and Pattern Recognition,, 2013, 8 pages.
Chen, et al.,' "A Simple Model for Intrinsic Image Decomposition with Depth Cues", In Computer Vision (ICCV), 2013, 8 pages.
Han, et al.,' "High Quality Shape from a Single RGB-D Image under Uncalibrated Natural Illumination", In Computer Vision (ICCV), 2013, 2013, pp. 1617-1624.
Ramamoorthi, et al.,' "An Efficient Representation for Irradiance Environment Maps", In Proceedings of the 28th Annual Conference on Computer Graphics and Interactive Techniques, 2001, 4 pages.

* cited by examiner

*Primary Examiner* — Zhengxi Liu
(74) *Attorney, Agent, or Firm* — Wolfe-SBMC (57) ABSTRACT

This document describes techniques and apparatuses for constructing three dimensional (3D) surfaces for multi-colored objects. In some aspects, these techniques determine, from a color image and coarse depth information, an illumination model and albedo for a multi-color object. The coarse depth information may then be refined based on the illumination model and combined with the albedo to provide a 3D surface of the multi-color object.

20 Claims, 7 Drawing Sheets

CONSTRUCTING 3D SURFACES FOR MULTI-COLOR OBJECTS

BACKGROUND

With the constant advancement of three dimensional (3D) printing and 3D rendering technology, emphasis on 3D scanning for content generation is increasing. High-quality 3D scanning, however, often requires specialized and complex scanning systems that are prohibitively expensive for most consumers. Further, some 3D scanning systems are only able to generate 3D models for diffuse objects of solid-color, which can severely limit real-world applications of these systems. As such, capturing high-quality 3D scans of multi-color objects can be a difficult or impossible endeavor for most consumers.

The preceding background description is provided herein for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques and apparatuses for constructing 3D surfaces for multi-colored objects. These techniques are capable of constructing 3D surfaces for multi-color objects based on color imagery and coarse depth information, in some cases by leveraging image and depth sensors that are readily available to consumers. In contrast to some current techniques, the techniques described in this document can scan objects with multiple, varying albedos, and provide fully relightable 3D models. Further, some aspects of these techniques operate in the log domain effective to simplify the operations performed when generating the relightable 3D models.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques and apparatuses for three-dimensional (3D) scanning are often unable to provide high-resolution 3D surfaces or models of multi-color objects. A multi-color object, due to its varying multiple colors, has complex albedo, which is a reflection coefficient that indicates color reflectance of the object's surfaces. Typically, conventional systems are able to generate 3D models for solid-color objects, which have a substantially constant albedo, by resolving shading of the object from an intensity of object imagery. For multi-color objects having complex albedo, however, these systems are often unable to resolve the shading of the object from the intensity, which also includes variable components of the complex albedo. Further, the complexity and costs associated with systems that are capable of scanning objects with complex albedo often preclude the use of such systems by most, if not all, consumers. As such, most consumers are unable to capture high-quality 3D models of multi-color objects or generate 3D content associated therewith.

This disclosure describes techniques and apparatuses for constructing 3D surfaces for multi-color objects, which enable the construction of 3D surfaces based on color imagery and coarse depth information. The complexity and cost of the components used to capture the color imagery and coarse depth information can be relatively low, with a resulting 3D surface having an optimized depth or albedo resolution that is high.

In various examples set forth below, the techniques determine an illumination model and albedo for a multi-color object based on the object's color image and coarse depth information. The coarse depth information is then refined based on the illumination model and a relightable 3D surface is constructed based on the albedo and refined depth information. In some of these examples, the techniques decompose, based on coarse depth information, a red-green-blue (RGB) image into shading, lighting, and albedo information for a multi-color object. The coarse depth information is then refined, based on the shading and lighting information, and used, with the albedo, to provide a relightable 3D mesh of the multi-color object. Alternatively or additionally, in some examples various operations are preformed iteratively to determine more-refined depth information and/or albedo by which to construct the relightable 3D surface or mesh.

The discussion now turns to an operating environment, techniques that may be employed in the operating environment, and a System-on-Chip (SoC) in which components of the operating environment can be embodied. In the discussion below, reference is made to the operating environment by way of example only.

Operating Environment

Figure 1:
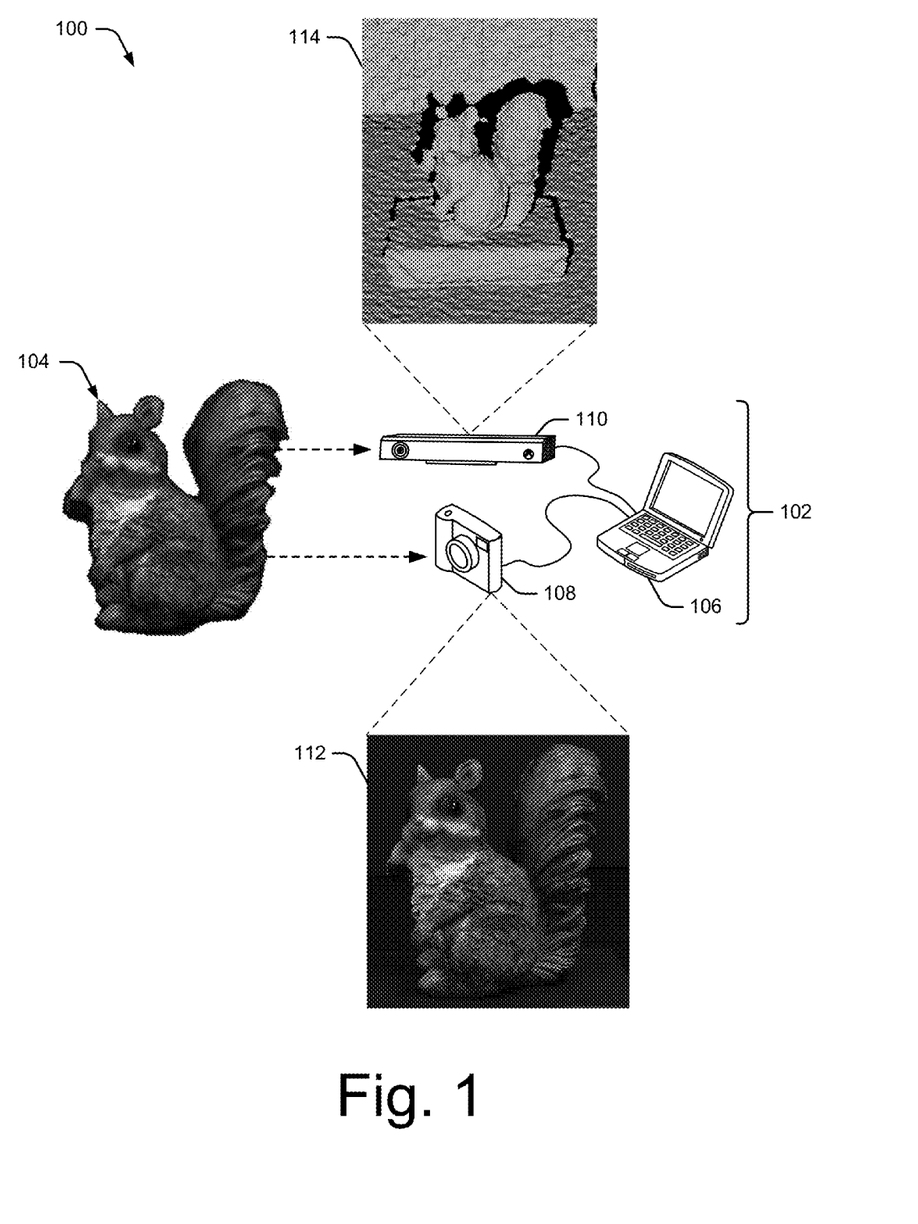
FIG. 1 illustrates an operating environment having a 3D scanning system that includes an image sensor, a depth sensor, and a computing device.

FIG. 1 illustrates an operating environment 100 that includes a 3D scanning system 102 and multi-color object 104, which in this particular example is a squirrel having various colors. Multi-color object 104 may include any suitable 3D object of varying color (e.g., complex albedo). 3D scanning system 102 includes computing device 106, image sensor 108, and depth sensor 110. Although shown as separate and operatively associated via wired connections, computing device 106, image sensor 108, and depth sensor 110 may be embodied as fewer and/or a single device. For example, 3D scanning system 102 may be implemented in whole or part as a gaming device, set-top box, laptop computer, table computer, smart phone, depth-sensitive camera, video camera, television, monitor, and so on.

Image sensor 108 is sensitive to light of an object or scene, such as multi-color object 104. Image sensor 108 may be configured as any suitable imagery device, such as a camera (e.g., digital single-lens reflex (DSLR)), web cam, video camera, gaming device, optical sensor, and the like. An image of the light captured by image sensor 108 may be expressed, on a per-pixel basis, as an intensity of the object or scene that includes components of albedo (e.g., reflectance) and shading. In some cases, image sensor 108 provides an image for a multi-color object in the form of red-green-blue (RGB) data. In such cases, this RGB data may describe a multi-color object in terms of intensity or chromaticity. In the context of the present example, image sensor 108 provides high-resolution RGB image 112 of multi-color object 104.

Depth sensor 110 is configured to provide depth information for an object or scene, such as multi-color object 104. Depth sensor 110 may be implemented as any suitable type of depth sensor or system, such as an optical depth sensor, infrared depth sensor (active or passive), known-geometry modeling system (e.g., facial modeling or reconstruction), multi-image depth estimation system (e.g., multi-view system), and the like. The depth information provided by depth sensor 110 may be coarse depth information for the object or scene to which depth sensor 110 is directed. In the context of the present example, depth sensor 110 provides coarse depth information 114 of multi-color object 104.

Figure 2:
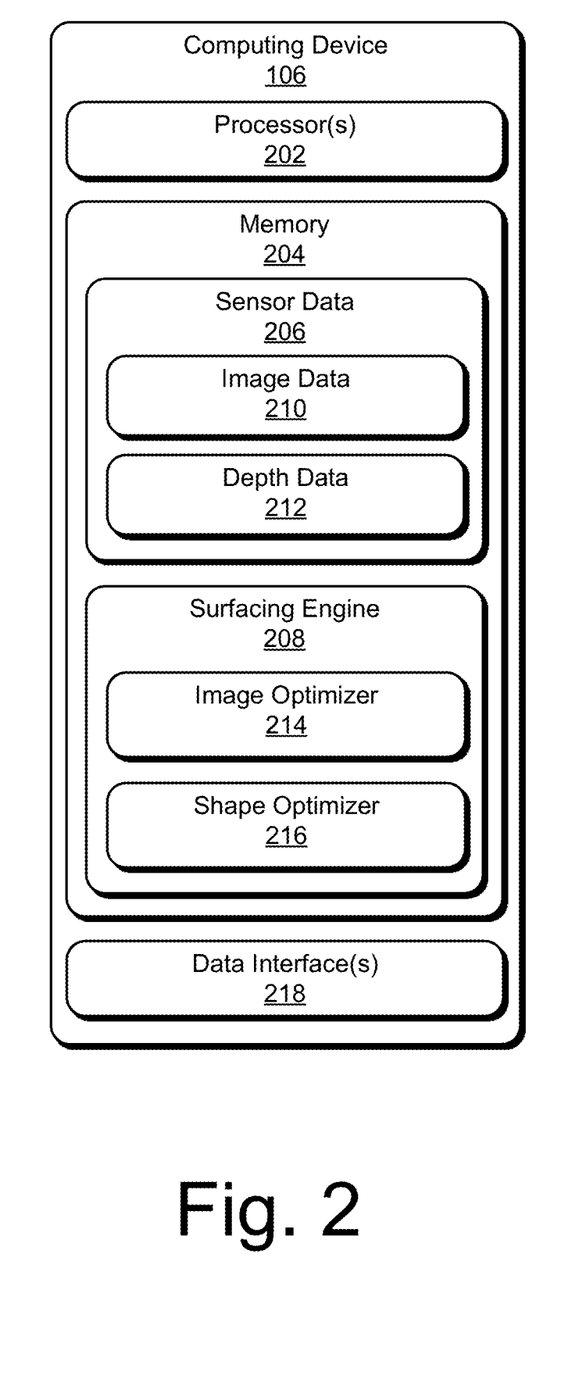
FIG. 2 illustrates example components of the computing device of FIG. 1 that include a surfacing engine and other elements usable by the techniques.

FIG. 2 illustrates computing device 106 of 3D scanning system 102 in more detail, as well as example elements usable by the techniques described herein. Computing device 106 includes one or more processors 202 and computer-readable storage memory ("memory") 204. Memory 204 may include any suitable type of memory media or devices, such as volatile memory, non-volatile memory, random-access memory, storage drives, and the like. Memory 204 includes sensor data 206 and surfacing engine 208, which is capable of accessing and/or manipulating sensor data 206. Sensor data 206 includes image data 210 and depth data 212, which are captured by or received from image sensor 108 and depth sensor 110, respectively. Alternately or additionally, image data 210 or depth data 212 may be accessed by computing device 106 from a remote or network location to implement the techniques.

Image data 210 includes intensity information, such as RGB data, for an object or scene. This intensity information may be decomposed into two components, albedo and shading. Albedo, or reflectance, is the basic color reflectance of all surfaces in a scene. Albedo can be wholly or mostly independent of lighting of the image data. Shading is the pure effect of lighting in combination with geometry of the scene which in turn is independent of the albedo. For most image data, such as RGB data, these components are observed in combination with each other rather than being separate or easily separable. Depth data 212 may include coarse depth information, such as coarse depth information 114 shown in FIG. 1. In some cases, a resolution of depth data 212 may be limited due to an ability of depth sensor 110 to capture precise depth information for multi-color objects.

Surfacing engine 208 has access to sensor data 206 and includes image optimizer 214 and shape optimizer 216.

Image optimizer 214 is configured to perform image optimization, such as by intrinsic image optimization. Shape optimizer 216 is configured to perform shape optimization, such as by shape from shape optimization. In at least some embodiments, surfacing engine 208 uses image optimizer 214 and shape optimizer 216 to provide relightable 3D surfaces for multi-color objects. Ways in which entities of FIGS. 1 and 2 act and interact are set forth in further detail below. While surfacing engine 208, image optimizer 214, and shape optimizer 216 are shown separate and as computer-executable instructions executable by processor(s) 202, they may instead be hardware or firmware, or a combination of hardware, firmware, and/or software, and be integrated or separate.

Computing device 106 also includes data interfaces 218, which enable computing device 106 to communicate with image sensor 108, depth sensor 110, other sensors (not shown), and the like. In some cases, computing device 106 accesses sensor data stored remotely (e.g., network locations) via data interfaces 218. In such cases, data interfaces 218 may communicate using any suitable network or communication protocol to access said sensor data. Alternately or additionally, data interfaces 218 may enable access or communication with other devices storing sensor data, such as storage drives, memory cards, or wearable computing devices.

Techniques for Constructing 3D Surfaces for Multi-Color Objects

As noted above, the techniques enable construction of 3D surfaces for multi-color objects, such as those with complex albedo. The following methods are described in part using entities and examples of FIGS. 1 and 2, though this is for example only. Methods described herein can be performed by one or multiple entities, and be combined, in whole or in part. The order shown for operations performed is for example only, and is not intended to limit the techniques.

Figure 3:
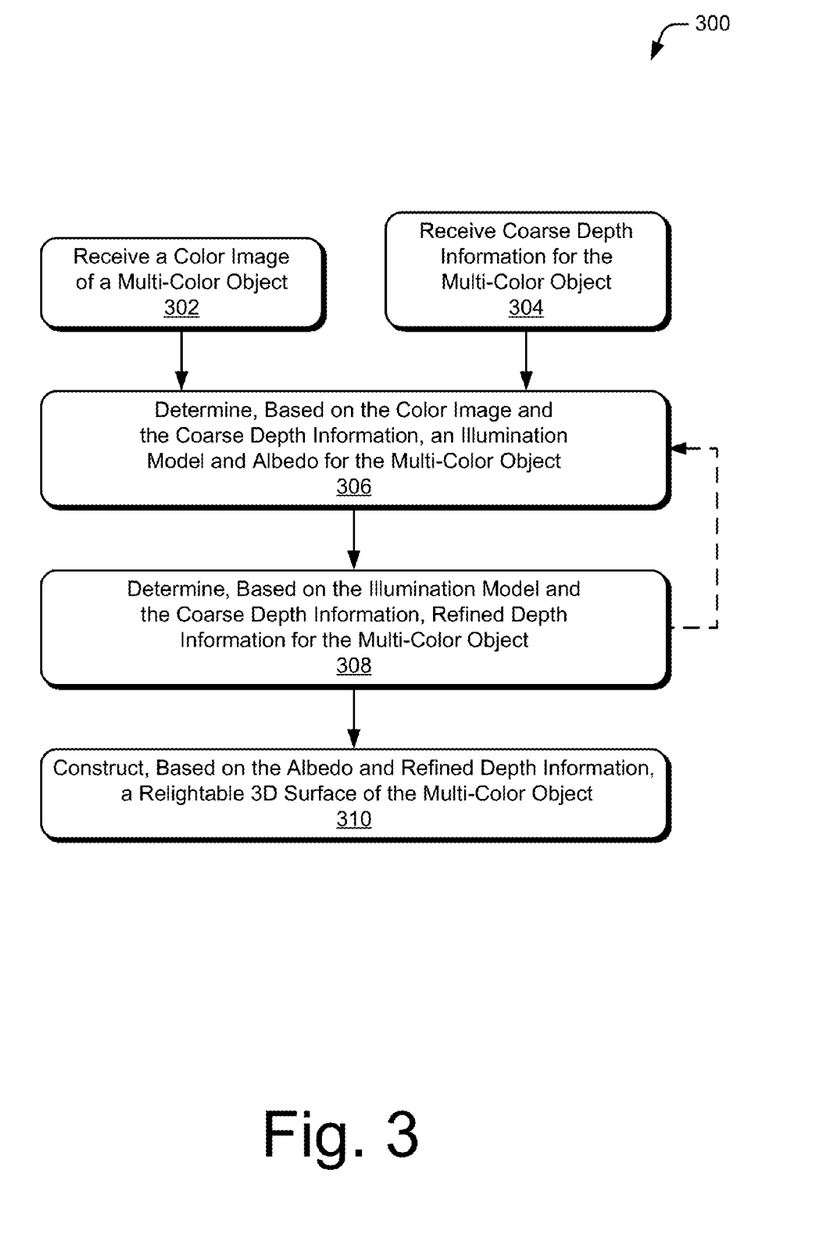
FIG. 3 illustrates example methods for constructing a relightable surface for a multi-color object.

FIG. 3 illustrates example method 300 that enables construction of 3D surfaces for multi-color objects, including operations performed by surfacing engine 208 of FIG. 2.

At 302, a color image of a multi-color object is received. The color image may be received from an image sensor, local data repository, or remote data repository (e.g., network location). In some cases, the color image is an RGB image that describes each pixel in terms of red, green, and blue intensity and/or chromaticity. By way of example, consider high-resolution RGB image 112 of multi-color object 104 that is captured by image sensor 108. A formation model for intensity (I) of the color image, on a per-pixel (p) basis, may be expressed as a function of albedo (R) and shading (S), as shown in equation 1.

$$I_p = R_p \cdot S_p \qquad \text{Equation 1}$$

Taking the log domain of equation 1 provides equation 2, in which (i) is log(I), (r) is log(R), and (s) is log(S). By operating in the log domain, exponentiation may be avoided when solving or optimizing for various image values.

$$i_p = r_p + s_p \qquad \text{Equation 2}$$

As noted above, the albedo, or reflectance, is the basic color reflectance of all surfaces of an object or scene in the image, which is independent of lighting. The shading, which is independent of the albedo, is the pure effect of lighting in combination with geometry of the object or scene of the image. Further, equation 2 can by reformulated as equation 3, which is a linear energy minimization model that can be employed to decompose or optimize the RGB image.

$$\operatorname*{argmin}_{r,s} \sum_p \|i_p - (r_p + s_p)\|^2 \quad \text{Equation 3}$$

Regularizing the image optimization may include regularizing regions with similar albedos via chromaticity. By so doing, pixels with similar chromaticity can be forced to have similar albedo or reflectance. This may also be effective to constrain the image optimization operations such that albedo values can be optimized. An example albedo regularization is illustrated by equations 4 and 5, in which chromaticity (C) is defined using the RGB values (R, G, B) of each pixel (T).

$$C = \frac{(RGB)^T}{R + G + B} \quad \text{Equation 4}$$

Using a Gaussian function, pairwise weights ($w_{p,p'}$) can be defined using differences in chromaticity space as shown in equation 4.

$$w_{p,p'} = \exp\left(\frac{\|c_p - c_{p'}\|^2}{\sigma}\right) \quad \text{Equation 5}$$

The albedo regularization of equation 5, for given sets of pixel pairs (P), can then be added to the linear energy minimization model of equation 3 as shown by equation 6.

$$\operatorname*{argmin}_{r,s} \sum_p \|i_p - (r_p + s_p)\|^2 + \sum_{p,p' \in P} \omega_{p,p'} \|r_p - r_{p'}\|^2 \quad \text{Equation 6}$$

Although equation 6 may be complex depending on the pixel pairs (P), each pixel may be connected to other neighboring pixels, such as a 3×3 pixel patch, to reduce complexity. Alternately or additionally, randomized non-local constraints may also be applied to the pixel pairs. Equation 6 may be further reduced to a linear system by enforcing equation 1 as r=i−s to provide equation 7, which can be solved for shading.

$$\operatorname*{argmin}_{s} \sum_{p,p' \in P} \omega_{p,p'} \|i_p - i_{p'} - s_p + s_{p'}\|^2 \quad \text{Equation 7}$$

At 304, coarse depth information for the multi-color object is received. The coarse depth information may be received from a depth sensor, depth sensing system, local data repository, or remote data repository. The coarse depth information may be received in any suitable format, such as in combination with color image information (e.g., RGB and depth). By way of example, coarse depth information 114 of multi-color object 104 that is captured by depth sensor 110. In some cases, shading of an image can be expressed via a lighting function (L) that operates based on the coarse depth information (d) and lighting (l). An example spherical harmonics lighting function is shown in equation 8, which includes pre-computable basis functions (Y).

$$s = L(l, d) = \sum_i l_i \cdot Y_i(d) \quad \text{Equation 8}$$

At 306, an illumination model and albedo are determined for the multi-color object based on the color image and coarse depth information. In some cases, the determining includes estimating chromaticity information for the color image and regularizing the albedo of the multi-color object with the estimated chromaticity information. Alternately or additionally, the coarse depth information may be rendered with spherical harmonics, such as those described with reference to equation 8. Further, operations to determine the illumination model and albedo may operate (directly or indirectly) in the log domain effective to avoid exponentiation during the determination. Generally, equations 3 and 8 can be re-written as equation 9, which can be solved or optimized for albedo and an illumination model.

$$\operatorname*{argmin}_{r,l} \|i - (r + L(l, d))\|^2 \quad \text{Equation 9}$$

By implementing an algorithm based on equation 9, image optimizer 214 of surfacing engine 208 can determine, based on high-resolution RGB image 112 and coarse depth information 114, albedo and an illumination model for multi-color object 104.

At 308, refined depth information for the multi-color object is determined based on the illumination model and the coarse depth information. In some cases, a regularizer is implemented with the coarse depth information during the refinement operations. Alternately or additionally, a smoothness regularizer may also be implemented via the coarse depth information to smooth the refined depth information. The illumination model may be any suitable type of model, such as a spherical lighting harmonics model that provides shading as a function of depth and lighting coefficients. With the albedo and illumination model provided by solving equation 9, equations 10a and 10b can then be used to determine refined depth information.

Equations 10a and 10b $$\operatorname*{argmin}_{d} \|s - L(l, d)\|^2 \quad (10a)$$

$$s = i - r \quad (10b)$$

Figure 4:
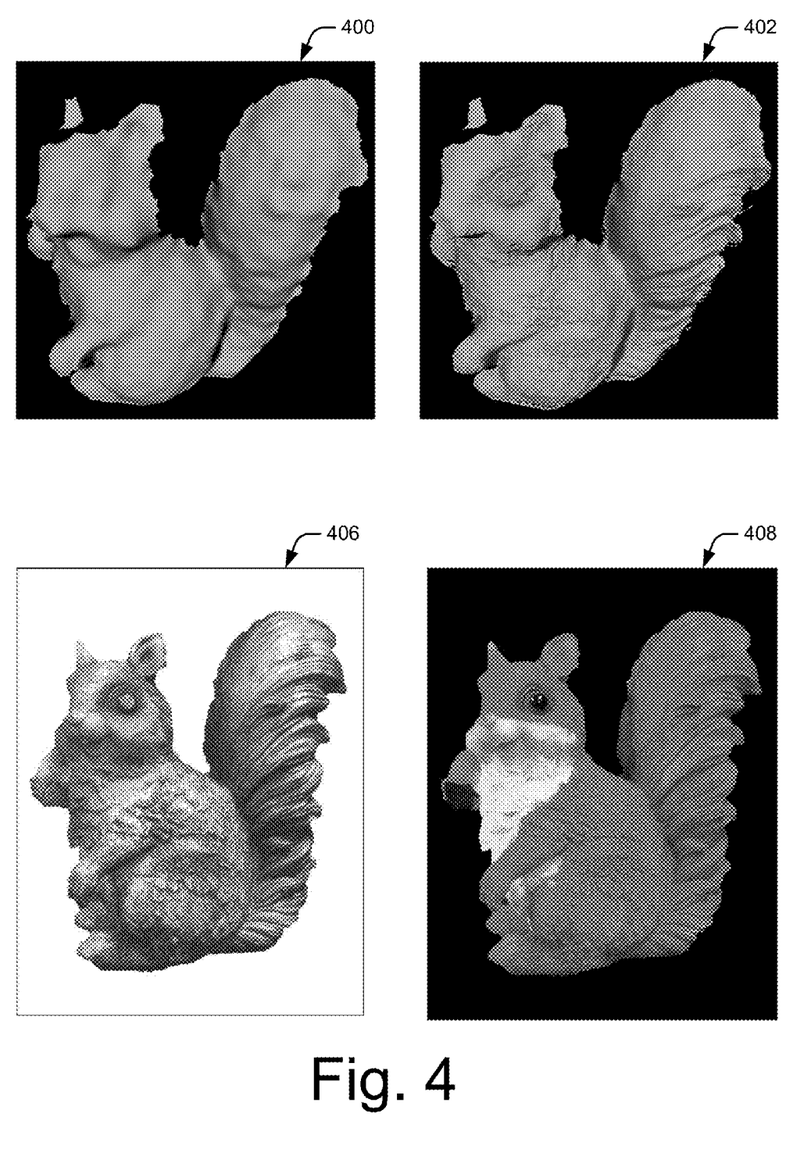
FIG. 4 illustrates examples of depth and albedo information provided by the operations described with reference to FIG. 3.

By implementing an algorithm based on equation 10a, shape optimizer 216 of surfacing engine 208 can determine, based on the albedo and illumination model, refined depth information for multi-color object 104. Additionally operations 306 and/or 308 may be repeated iteratively to further refine albedo and depth information for object 104. By way of example, consider FIG. 4, in which varies refinements of depth information are illustrated. Filtered depth information 400 provides a baseline for depth optimization, of which an intermediate result is show at 402. By repeating the optimizations of operations 306 and 308, refined depth information 406 and high-resolution albedo 408 are determined for multi-color object 104. Here, note the improved resolution from filtered depth information 400, which is a typical product of consumer level depth sensors, to refined depth information 406. As illustrated by FIG. 4, the techniques described herein produce depth and albedo information at substantially higher resolutions than conventional techniques.

At 310, a relightable 3D surface is constructed based on the albedo and the refined depth information. This relightable 3D surface may be constructed without shading information, which has been extracted or separated from the albedo and refined depth information. An example of this is illustrated by high-resolution albedo 408, which lacks the shading (e.g., shadows) visible in high-resolution RGB image 112. Once constructed, the relightable 3D surface can be imported, manipulated, re-lit, and the like to provide 3D content based on the original multi-color object.

Figure 5:
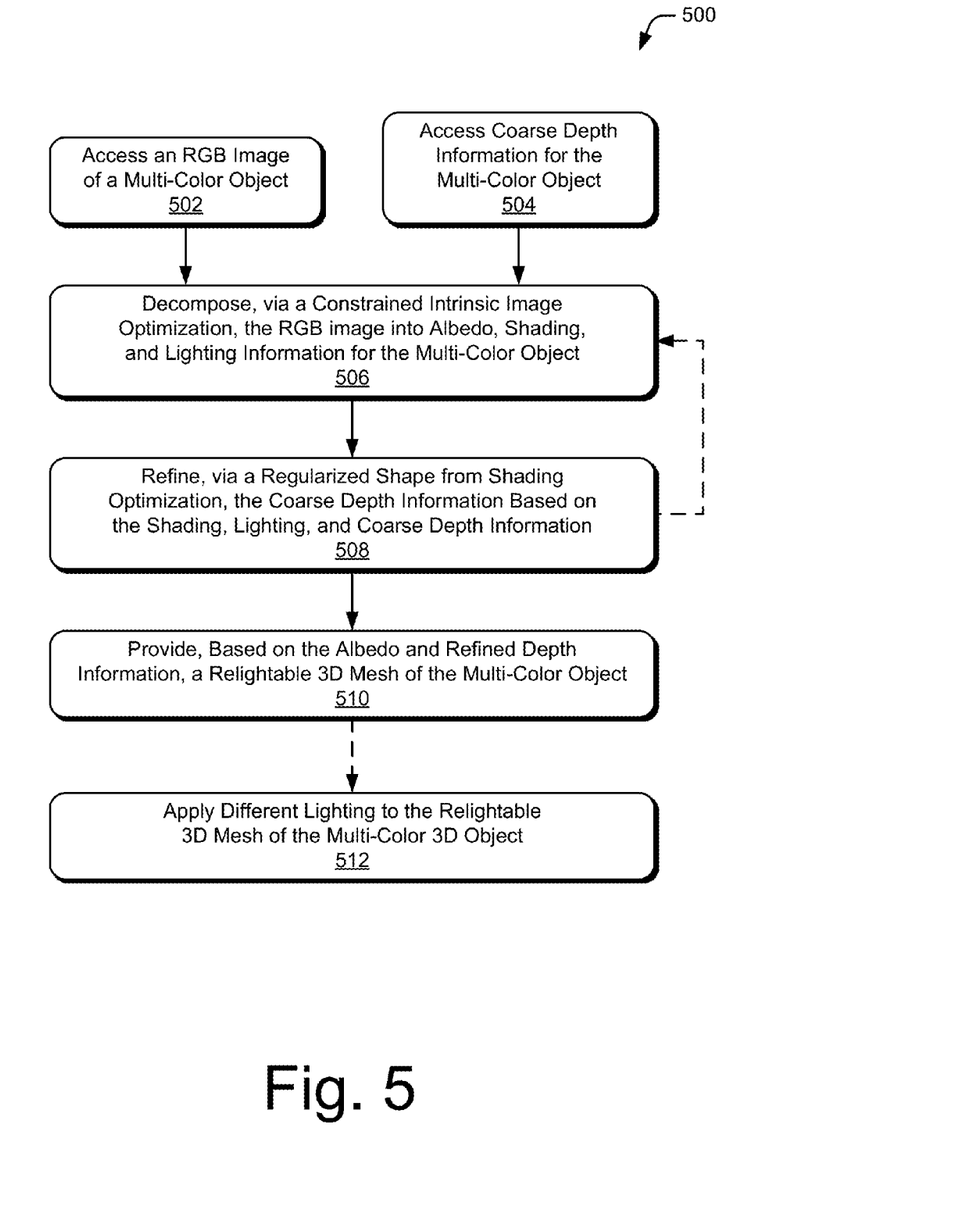
FIG. 5 illustrates example methods for refining coarse depth information to provide a relightable mesh of a multi-color object.

FIG. 5 illustrates example method 500 that enables refinement of coarse depth information to provide a relightable 3D mesh of a multi-color object, including operations performed by surfacing engine 208 of FIG. 2.

At 502, an RGB image of a multi-color object is accessed. The RGB image may be accessed via an image sensor, local data repository, or remote data repository. The data of RGB image describes each pixel in terms of red, green, and blue intensity and/or chromaticity. By way of example, consider FIG. 6, which includes RGB image 600 of a multi-color frog. Here, assume that 3D scanning system 102 captures, via image sensor 108, RGB image 600 of the multi-color frog. Each pixel of RGB image 600 includes red, green, and blue intensity values that describe the combined albedo and shading of the multi-color frog.

Figure 6:
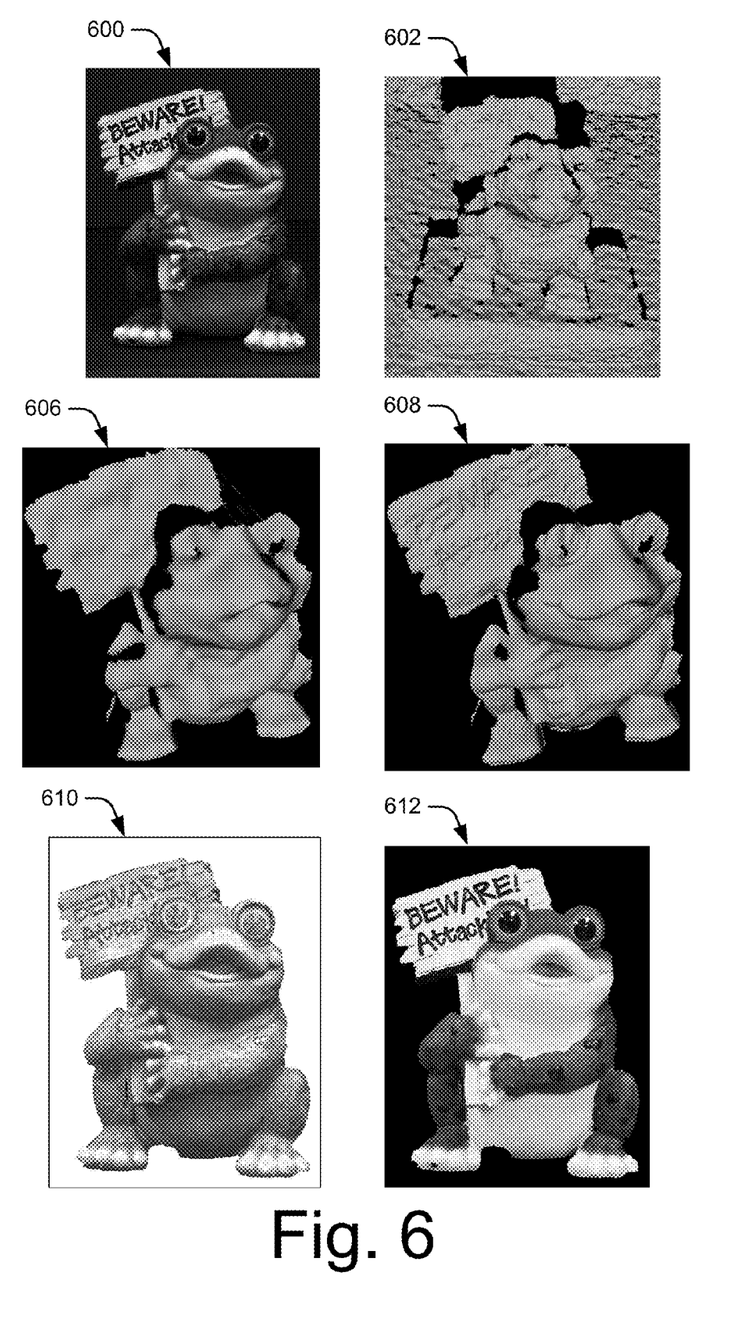
FIG. 6 illustrates examples of depth and albedo information from which a relightable mesh are provided.

At 504, coarse depth information for the multi-color object is received. The coarse depth information may be accessed via a depth sensor, depth sensing system, local data repository, or remote data repository. Alternately or additionally, the coarse depth information may be received in any suitable format, such as in combination with the RGB image (e.g., RGB and depth). In the context of the present example, 3D scanning system 102 captures, via depth sensor 110, coarse depth information 602 for the multi-color frog.

At 506, the RGB image is decomposed into estimated albedo, shading, and lighting information. In some cases, the image is decomposed via an intrinsic image optimization using coarse depth information. In such cases, the following equations may be implemented as algorithms by a surfacing engine to perform the image decomposition and/or intrinsic image optimization. As noted above, intensity values of the image or image formation can be modeled as a function of albedo and shading (e.g., lighting function), examples of which include equations 2 and 9.

Extending the above-described intrinsic image optimization to include additional constraints of the coarse depth information, components of equation 7 can be combined with equation 10 to provide equation 11, which is an optimization for solving both shading and lighting parameters.

$$\underset{s,l}{\operatorname{argmin}} \sum_{p,p' \in P} \omega_{p,p'} \|i_p - i_{p'} - s_p + s_{p'}\|^2 + \sum_p \|s_p - L(l, d)_p\|^2 \quad \text{Equation 11}$$

The lighting model L(l,d) implemented by the optimization may be any suitable lighting model, such as a spherical harmonics (SH) lighting model. In such cases, the lighting model computes the reflected light of a surface point of an object given its depth d (e.g., coarse depth) and up to 9 coefficients of the SH lighting l. Further, light model L normals (n) of a depth map can be computed on the fly via finite differences. Alternately or additionally, SH lighting model base functions (b) for every pixel can be pre-computed before optimization. Accordingly, evaluating L(l,d) during the image optimization results in a simple dot product of $l^T b$, which indicates that the optimization is linear rather than exponential.

In the context of the present example, image optimizer 214 of surfacing engine 208 decomposes image 600 of the multi-color frog into albedo, shading, and lighting information. To do so, image optimizer 214 implements an algorithm, based on equations 3-11, that receives RGB image 600 and coarse depth information 602 as inputs. From these inputs, image optimizer provides the optimized (or estimated) albedo, shading, and lighting information for the multi-color frog.

At 508, the coarse depth information is refined based on the estimated shading and lighting information for the object, such as the optimized information provided by operation 506. The coarse depth information, or initial depth information, may also be used in the refinement process. In some cases, the refinement is implemented via a shape from shading (SfS) operation. In such cases, the following equations may be implemented as algorithms by a surfacing engine to perform the depth refinement and/or shape from shading operations. Applying estimated shading and lighting parameters, a shape from shading operation can be solved for detailed depth (d) as shown by equation 12. Here, note that equation 12 is similar to and/or builds on equation 10a, which is described above with respect to refining depth information.

$$\underset{d}{\operatorname{argmin}} \sum_p \|s_p - L(l, d)_p\|^2 \quad \text{Equation 12}$$

To enable optimization of equation 12, initial (e.g., coarse) depth information (c) is added as a regularizer as shown in equation 13 (second term). Alternately or additionally, a small first order regularizer based on d is added to smooth the refined depth information (third term). This smoothing regularizer may be effective to constrain geometry for pixels lacking geometry information or smooth the resulting depth information, thereby avoiding high frequency noise caused by local minima in the shading energy.

$$\underset{d}{\operatorname{argmin}} \sum_p \|s_p - L(l, d)_p\|^2 + \sum_p \|d_p - c_p\|^2 + \|\nabla d\|^2 \quad \text{Equation 13}$$

In some cases, the regularizer is normalized due to the scale of the measurements or values of the depth information (c), which may range from 1 to 1000 depending on a type of depth input received. Normalizing this part of the energy can be performed by a simple weighting of the initial depth information as shown in equation 14.

$$\frac{100}{\operatorname{median}(c)} \sum_p \|d_p - c_p\|^2 \quad \text{Equation 14}$$

In the ongoing example, shape optimizer 216 of surfacing engine 208 refines coarse depth information 602 using the estimated shading and lighting information provided by image optimizer 214. To do so, shape optimizer 216 implements a shape from shading optimization based on equations 12-14, which uses the coarse depth, estimate shading, and estimated lighting information to provide refined depth information. From filtered depth information 606, shape optimizer 216 provides refined depth information 608, in which details of the multi-color frog are more discernable.

Additionally, operations 506 and/or 508 may be repeated iteratively to further refine albedo and depth information for the multi-color object. At each iteration, previously estimated or determined information may be leveraged to increase a resolution of the refined albedo and depth information. Alternately, the iterations may be performed on multiple scales, such as fine to coarse effective to provide more-refined levels of albedo and depth information. By repeating operations 506 and 508, surfacing engine 208 is able to provide more-refined depth information 610 and high-resolution albedo 612 for the multi-color frog.

At 510, a relightable 3D mesh of the multi-color object is provided based on the albedo and the refined depth information. This relightable 3D mesh may be constructed without shading or lighting information, which is extracted or separated from the albedo during the preceding optimizations. By doing so, other light or shading effects can be applied to the 3D mesh of the multi-color object. An example of this is illustrated by high-resolution albedo 612, which lacks the shading (e.g., shadows) visible in high-resolution RGB image 600.

Optionally at 512, different lighting is applied to the 3D mesh effective to re-light the 3D mesh of the multi-color object. The different lighting may include any suitable light source, which may be user defined. Because the 'baked-in' lighting information of the RGB is effectively stripped from the albedo of the 3D mesh, a user or content producer may re-light the 3D mesh as desired. Concluding the present example, assume that a user re-lights the multi-color frog with a more-intense light source to better reveal details of not only the multi-color frog, but also the details of the sign held by the multi-color frog.

System-On-Chip

Figure 7:
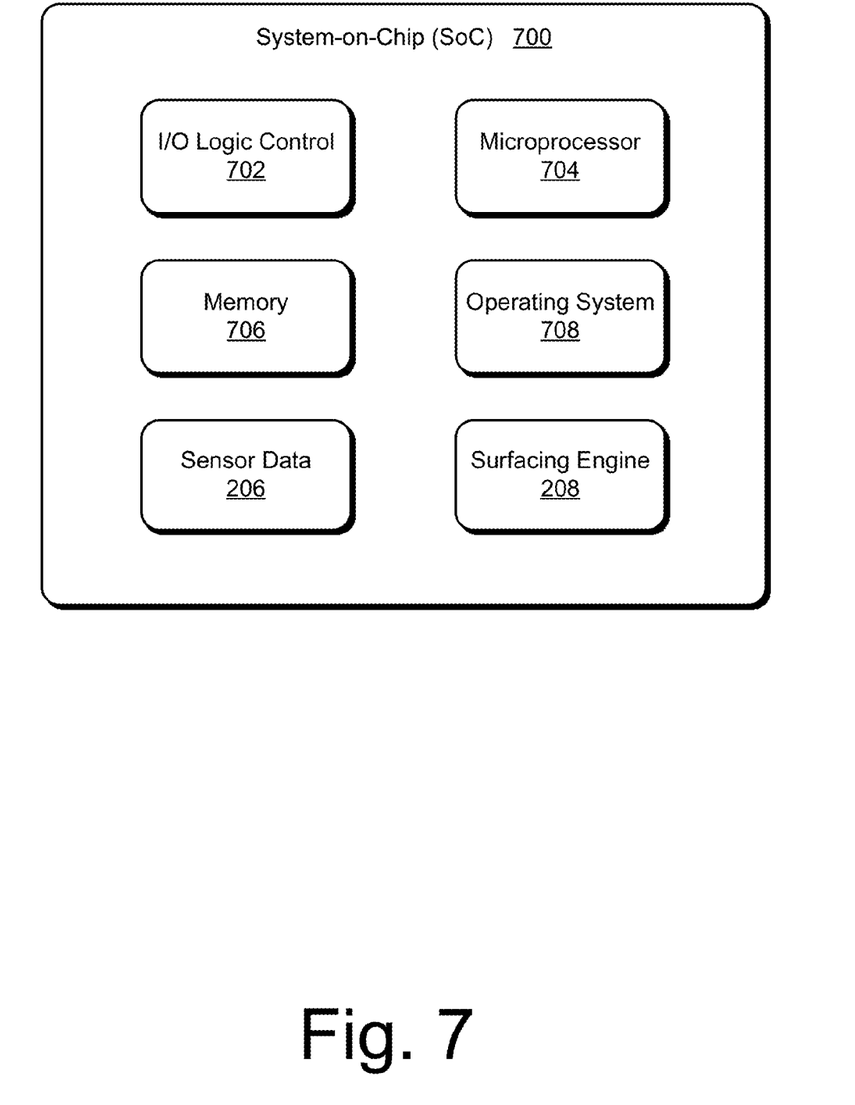
FIG. 7 illustrates a System-on-Chip (SoC) environment for implementing embodiments of the techniques described herein.

FIG. 7 illustrates a System-on-Chip (SoC) 700, which can implement various embodiments described above. An SoC can be implemented in a fixed or mobile device of various types. SoC 700 can be integrated with electronic circuitry, a microprocessor, memory, input-output (I/O) logic control, communication interfaces and components, other hardware, firmware, and/or software needed to run an entire device (e.g., 3D printer 72). SoC 700 can also include an integrated data bus (not shown) that couples the various components of the SoC for data communication between the components. A device that includes SoC 700 can also be implemented with many combinations of differing components.

In this example, SoC 700 includes various components such as an input-output (I/O) logic control 702 (e.g., to include electronic circuitry) and a microprocessor 704 (e.g., any of a microcontroller or digital signal processor). SoC 700 also includes a memory 706, which can be any type of random access memory (RAM), a low-latency nonvolatile memory (e.g., flash memory), read only memory (ROM), and/or other suitable electronic data storage. SoC 700 can also include various firmware and/or software, such as an operating system 708, which can be computer-executable instructions maintained by memory 706 and executed by microprocessor 704. SoC 700 can also include other various communication interfaces and components, wireless LAN (WLAN) or PAN (WPAN) components, other hardware, firmware, and/or software.

SoC 700 includes sensor data 206 and/or surfacing engine 208, which may include various components of FIG. 2 as well. Surfacing engine 208 in SoC 700, either independently or in combination with other entities, can be implemented as computer-executable instructions maintained by memory 706 and executed by microprocessor 704 to implement various embodiments and/or features described herein, such as constructing 3D surfaces for multi-color objects. Sensor data 206 or surfacing engine 208 may also be provided integral with other entities of the SoC. Alternatively or additionally, sensor data 206, surfacing engine 208, and the other components can be implemented as hardware, firmware, fixed logic circuitry, or any combination thereof that is implemented in connection with the I/O logic control 702 and/or other signal processing and control circuits of SoC 700.

Although the subject matter has been described in language specific to structural features and/or methodological operations, the subject matter defined in the appended claims is not necessarily limited to the specific features or operations described above, including orders in which the operations are performed.

What is claimed is:

1. A computer-implemented method comprising:
   receiving a color image of a multi-color object;
   receiving coarse depth information for the multi-color object;
   determining, based on the color image and the coarse depth information, an illumination model and albedo for the multi-color object, the albedo determined at least in part by estimating chromaticity information for the color image and regularizing the albedo with pairwise weights defined by a Gaussian function applied to the estimated chromaticity information;
   determining, based on the illumination model and the coarse depth information, refined depth information for the multi-color object; and
   constructing, based on the albedo and the refined depth information, a relightable three-dimensional (3D) surface of the multi-color object.

2. The computer-implemented method of claim 1, further comprising:
   determining, based on the color image and the refined depth information, an updated illumination model and updated albedo of the multi-color object; and
   determining, based on the updated illumination model and the refined depth information, more-refined depth information for the multi-color object by which to construct the relightable 3D surface of the multi-color object.

3. The computer-implemented method of claim 1, wherein the pairwise weights are defined for pixel pairs of the color image and regularizing the albedo includes determining, for a given pixel of the color image, at least two of the weights for the given pixel and at least two other pixels that are adjacent to the given pixel.

4. The computer-implemented method of claim 1, wherein determining the refined depth information for the multi-color object includes regularizing or smoothing the refined depth information based on the coarse depth information.

5. The computer-implemented method of claim 1, wherein determining the illumination model for the multi-color object includes rendering the coarse depth information with spherical harmonics.

6. The computer-implemented method of claim 5, wherein the rendering is performed using a lighting function that operates on lighting coefficients based on the coarse depth information.

7. The computer-implemented method of claim 6, wherein the lighting function operates directly in a log domain effective to avoid exponentiation during the determining of the illumination model.

8. The computer-implemented method of claim 1, wherein the coarse depth information is received from a depth sensing system that includes one of an optical depth sensor, an infrared depth sensor, a known-geometry modeling system, or a multi-image depth estimation system.

9. The computer-implemented method of claim 1, wherein the color image is received from an image sensor and the color image of the multi-color object is a red-blue-green (RGB) image.

10. One or more hardware-based computer-readable storage devices having instructions stored thereon that, responsive to execution by one or more computer processors, perform operations comprising:
receiving, from an image sensor, a red-green-blue (RGB) image of a multi-color object;
receiving, from a depth sensing system, coarse depth information for the multi-color object;
decomposing, via a constrained image optimization, the RGB image into albedo, shading, and lighting information for the multi-color object, the albedo decomposed at least in part by estimating chromaticity information for the color image and regularizing the albedo with pairwise weights defined by a Gaussian function applied to the estimated chromaticity information;
refining, via a regularized shape optimization, the coarse depth information based on the shading, lighting, and coarse depth information; and
providing, based on the albedo and refined depth information, a relightable three dimensional (3D) mesh of the multi-color object.

11. The one or more hardware-based computer-readable storage devices of claim 10, wherein the operations of decomposing and refining are performed iteratively prior to providing the relightable 3D mesh of the multi-color object.

12. The one or more hardware-based computer-readable storage devices of claim 10, wherein the image optimization is constrained based on the coarse depth information.

13. The one or more hardware-based computer-readable storage devices of claim 10, wherein the shape optimization is regularized based on the coarse depth information.

14. The one or more hardware-based computer-readable storage devices of claim 13, wherein the operations further comprise, for the constrained image optimization, pre-computing base functions for a lighting model on which the optimization is based.

15. The one or more hardware-based computer-readable storage devices of claim 10, wherein the depth sensing system includes one of an optical depth sensor, an infrared depth sensor, a known-geometry modeling system, or a multi-image depth estimation system.

16. A multi-color three-dimensional (3D) scanning system comprising:
an image sensor configured to capture color images;
a depth sensor configured to provide coarse depth information;
a computer-readable memory storing processor-executable instructions for implementing a surface engine;
a processor configured to execute the processor-executable instructions to implement the surfacing engine to:
receive, from the image sensor, a color image of a multi-color object;
receive, from the depth sensor, coarse depth information for the multi-color object;
determine, based on the color image and the coarse depth information, an illumination model and albedo for the multi-color object, the albedo determined at least in part by estimating chromaticity information for the color image and regularizing the albedo with pairwise weights defined by a Gaussian function applied to the estimated chromaticity information;
determine, based on the illumination model and the coarse depth information, refined depth information for the multi-color object; and
construct, based on the albedo and the refined depth information, a three-dimensional relightable surface of the multi-color object.

17. The multi-color 3D scanning system of claim 16, wherein the surfacing engine is further implemented to, prior to constructing the relightable surface, iteratively perform the operation of determining the illumination model and the albedo and the operation of determining the refined depth information.

18. The multi-color 3D scanning system of claim 16, wherein the pairwise weights are defined for pixel pairs of the color image and regularizing the albedo includes determining, for a given pixel of the color image, at least two of the weights for the given pixel and at least two other pixels that are adjacent to the given pixel.

19. The multi-color 3D scanning system of claim 16, wherein determining the refined depth information for the multi-color object includes regularizing or smoothing the refined depth information based on the coarse depth information.

20. The multi-color 3D scanning system of claim 16, wherein the system is implemented as a gaming device, a set-top box, a laptop computer, a table computer, a smart phone, a camera, a video camera, a television, or a monitor.

* * * * *